(12) United States Patent
Shirani-Mehr et al.

(10) Patent No.: US 9,088,872 B2
(45) Date of Patent: Jul. 21, 2015

(54) HYBRID CODEBOOK DESIGN FOR WIRELESS SYSTEMS

(75) Inventors: Hooman Shirani-Mehr, Portland, OR (US); Debdeep Chatterjee, Santa Clara, CA (US); Apostolos Papathanassiou, San Jose, CA (US); Peter J. Smith, Christchurch (NZ); Mansoor Shafi, Wellington (NZ); Abdulla Firag, Male' (MV)

(73) Assignee: Intel Corporation, Santa Clara, CA (US)

( * ) Notice: Subject to any disclaimer, the term of this patent is extended or adjusted under 35 U.S.C. 154(b) by 203 days.

(21) Appl. No.: 13/529,280

(22) Filed: Jun. 21, 2012

(65) Prior Publication Data

US 2013/0156075 A1    Jun. 20, 2013

Related U.S. Application Data

(60) Provisional application No. 61/542,086, filed on Sep. 30, 2011.

(51) Int. Cl.
*H04B 1/38* (2006.01)
*H04W 4/06* (2009.01)
*H04B 7/04* (2006.01)
(Continued)

(52) U.S. Cl.
CPC ............... *H04W 4/06* (2013.01); *H04B 7/0456* (2013.01); *H04B 7/0619* (2013.01); *H04L 5/0032* (2013.01); *H04L 5/0037* (2013.01); *H04L 47/41* (2013.01); *H04W 4/08* (2013.01); *H04W 28/042* (2013.01); *H04W 36/0005* (2013.01); *H04W 52/0235* (2013.01); *H04W 52/04* (2013.01); *H04W 72/005* (2013.01); *H04W 72/042* (2013.01); *H04L 12/189* (2013.01); *Y02B 60/50* (2013.01)

(58) Field of Classification Search
CPC .. H04B 7/0456; H04B 7/0413; H04B 7/0619; H04L 47/41; H04L 5/0032; H04W 52/0235; Y02B 60/50
USPC ........... 375/219, 295, 316, 260; 370/342, 204
See application file for complete search history.

(56) References Cited

U.S. PATENT DOCUMENTS

2008/0108310 A1    5/2008    Tong et al.
2009/0154588 A1    6/2009    Chen et al.
(Continued)

OTHER PUBLICATIONS

Raghavan, et al., "Systematic Codebook Designs for Quantized Beamforming in Correlated MIMO Channels", IEEE Journal on Selected Areas in Communications, vol. 25, No. 7, Sep. 30, 2007, pp. 1298-1310.

(Continued)

*Primary Examiner* — Zewdu Kassa
(74) *Attorney, Agent, or Firm* — Alpine Technology Law Group LLC

(57) ABSTRACT

Briefly, in accordance with one or more embodiments, a codebook for wireless transmissions may be generated by dividing a codebook into a fixed set of codewords and an adaptive set of codewords. The adaptive set of codewords may be scaled to cluster together and then rotated to be centered or nearly centered about a target. The adaptive set of codewords may then be merged with the fixed set of codewords to provide a hybrid codebook. A codeword from the hybrid codebook may be selected for precoding a transmission to provide a minimum, or nearly minimum, quantization error.

28 Claims, 5 Drawing Sheets

(51) Int. Cl.

| | |
|---|---|
| *H04W 52/02* | (2009.01) |
| *H04L 12/891* | (2013.01) |
| *H04W 52/04* | (2009.01) |
| *H04B 7/06* | (2006.01) |
| *H04L 5/00* | (2006.01) |
| *H04W 72/04* | (2009.01) |
| *H04W 4/08* | (2009.01) |
| *H04W 36/00* | (2009.01) |
| *H04W 28/04* | (2009.01) |
| *H04W 72/00* | (2009.01) |
| *H04L 12/18* | (2006.01) |

(56) References Cited

U.S. PATENT DOCUMENTS

| | | | |
|---|---|---|---|
| 2010/0091893 | A1 | 4/2010 | Gorokhov |
| 2010/0226455 | A1 | 9/2010 | Porat et al. |
| 2011/0080964 | A1* | 4/2011 | Shamsi et al. ............... 375/260 |
| 2011/0243045 | A1* | 10/2011 | Dao et al. ...................... 370/310 |
| 2012/0045003 | A1 | 2/2012 | Li et al. |
| 2013/0058205 | A1* | 3/2013 | Tang ............................. 370/203 |

OTHER PUBLICATIONS

"3rd Generation Partnership Project; Technical Specification Group Radio Access Network; Evolved Universal Terrestrial Radio Access (E-Ultra); Multiplexing and Channel coding (Release 10)", 3GPP TS 36.212, vol. 10.1.0, Mar. 2011, pp. 1-76.

Raghavan, et al., "Quantized Multimode Precoding in Spatially Correlated Multiantenna Channels", IEEE Transactions on Signal Processing, vol. 56, No. 12, Dec. 2008, pp. 6017-6030.

Love, et al., "Limited Feedback Unitary Precoding for Spatial Multiplexing Systems", IEEE Transactions on Information Theory, vol. 51, No. 8, Aug. 2005, pp. 2967-2976.

"3rd Generation Partnership Project; Technical Specification Group Radio Access Network; Evolved Universal Terrestrial Radio Access (E-UTRA); Physical layer procedures (Release 10)", 3GPP TS 36.213 vol. 10.1.0, Mar. 2011, pp. 1-115.

"3rd Generation Partnership Project; Technical Specification Group Radio Access Network; Evolved Universal Terrestrial Radio Access (E-UTRA); Physical Channels and Modulation (Release 10)", 3GPP TS 36.211, vol. 10.1.0, Mar. 2011, pp. 1-103.

* cited by examiner

US 9,088,872 B2

HYBRID CODEBOOK DESIGN FOR WIRELESS SYSTEMS

CROSS-REFERENCE TO RELATED APPLICATIONS

The present application claims the benefit of U.S. application Ser. No. 61/542,086 (P39951Z) filed Sep. 30, 2011. Said application Ser. No. 61/542,086 is hereby incorporated herein by reference in its entirety.

BACKGROUND

In wireless systems such as multiple-input, multiple-output (MIMO) systems, to achieve the full benefit of transmitter processing and for optimal beamforming, the transmitter device, such as an enhanced Node B (eNB) in Long Term Evolution (LTE) systems, needs to have knowledge of the downlink (DL) channel. In time-division duplex (TDD) systems, such knowledge at the transmitter may be obtained by using downlink-uplink (DL-UL) channel reciprocity and transmitting reference signals such as pilot signals from the receiver user equipment (UE) to the transmitter eNB. However, in general, the UE has to measure the DL instantaneous channel on a DL reference signal and feed it back to the eNB. Feeding back the full channel may incur significant overhead. As a result, limited feedback schemes are employed in MIMO systems.

Some MIMO systems may employ a fixed codebook approach in which a codebook is constructed using a particular criterion. For example, in independent and identically distributed (IID) channels, the Grassmannian line packing technique may be utilized such that the distance between any two codewords is maximized. In the presence of correlation, there are other alternatives to codebook construction. Such fixed codebooks are particularly useful for channels which do not undergo rapid changes in their statistical properties. However, the design approaches may be complicated.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
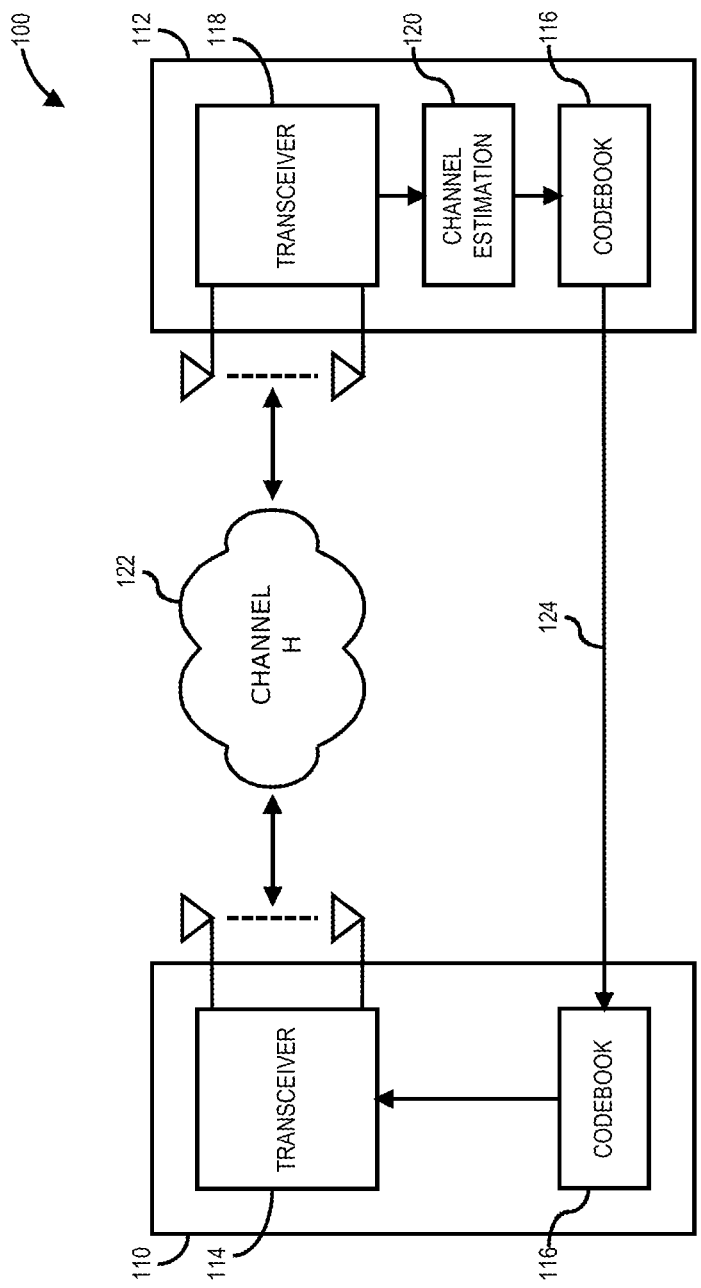
FIG. 1 is a diagram of a wireless system that may utilize a hybrid codebook in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. However, "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of a wireless system that may utilize a hybrid codebook in accordance with one or more embodiments will be discussed. As shown in FIG. 1, a wireless system 100 may comprise an enhanced Node B (eNB) 110 and user equipment (UE) 112 in accordance with a Long Term Evolution (LTE) or Advanced-LTE standard or the like. In general, eNB 110 may serve one or more UEs 112 in a given LTE network. However, one UE 112 is shown in and described with respect to FIG. 1 for purposes of discussion. The eNB 110 may comprise a transceiver 114 comprising a transmitter and receiver to communicate over a channel (H) 122 with UE 112 which also may comprise a transceiver 118 comprising a transmitter and receiver. In order to achieve optimal transmissions between the eNB 110 and the UE 112, knowledge of the channel 122 may be utilized to precode the transmissions, for example to minimize interference and to maximize throughput. The codebook 116 may be utilized to select a codeword for calculating a precoding matrix indicator (PMI) which is utilized to encode transmissions from the eNB 110 with a minimum quantization error. In general, the codebook 116 is known at both the eNB 110 and at the UE 112. In order to obtain knowledge of the channel, reference signals such as pilot signals may be transmitted from the eNB 110 to the UE 112 such that the UE 112 may estimate the channel via channel estimation block 120 by estimating the downlink (DL) channel, and such channel estimates may be provided to the eNB 110 as feedback 124. As part of this process, the UE 112 utilizes the codebook 116 to quantize the estimated channel by finding the closest codeword in the codebook 116 to the estimated channel. The UE 112 then transmits the index of this selected codeword to the eNB 110 via feedback 124. As a result, the eNB 110 knows the index of the codeword from codebook 116 that was selected by the UE 112, and then the eNB 110 utilizes this knowledge on the DL channel for user selection, precoding, and/or beamforming of one or more transmissions to one or more UEs 112. Where there are multiple UEs 112, the eNB 110 may receive feedback 124 from more than one of the UEs 112, and utilizes this knowledge for precoding downlink transmissions to one or more or the UEs 112. The eNB 110 may select one of the codewords from codebook 116 that corresponds to the codeword selected by one or more of the UEs 112, or may select one of the codewords based at least in part on the codewords selected by the UEs 112, which may the same codeword that was selected a UE 112, or which may be a different codeword. An example of a communication system and method for providing channel feedback for MIMO communications is shown and described in US Pub. No. US 2012/0045003 A1, application Ser. No. 12/861,685 filed Aug. 23, 2010, which is hereby incorporated herein in its entirety. Furthermore, although wireless system 100 is described herein as an LTE or and Advanced-LTE system, wireless system 100 may comprise various other types of wireless systems such as a Worldwide Interoperability for Microwave Access (WiMAX) system in accordance with an Institute of Electrical and Electronics Engineers (IEEE) 802.16e standard, a WiMAX II (Release 2) system in accordance with an IEEE 802.16m standard, and so on, and the scope of the claimed subject matter is not limited in this respect.

In accordance with one or more embodiments, wireless system 100 may be adapted such that the codebook 116 utilized by eNB 110 and by one or more of the UEs 112 may comprise a hybrid codebook having a fixed codebook component and an adaptive codebook component. The adaptive codebook component may enable the wireless system 100 to track slowly varying channel conditions and adapt to the changes in the statistical properties of the channel. Codewords may be selected from the fixed codebook component when channel variations are significant and adaptive codewords are unable to track them. The hybrid codebook 116 allows for the scaling and/or rotation of a set of codewords chosen from a fixed codebook. The chosen set of codewords is the adaptive codebook component. The rotation operation allows the chosen codeword set to a given direction, and the scaling will shrink the codewords toward a given center or target vector. The construction of such an adaptive hybrid codebook 116 is shown in and described with respect to FIG. 2, below.

Figure 2:
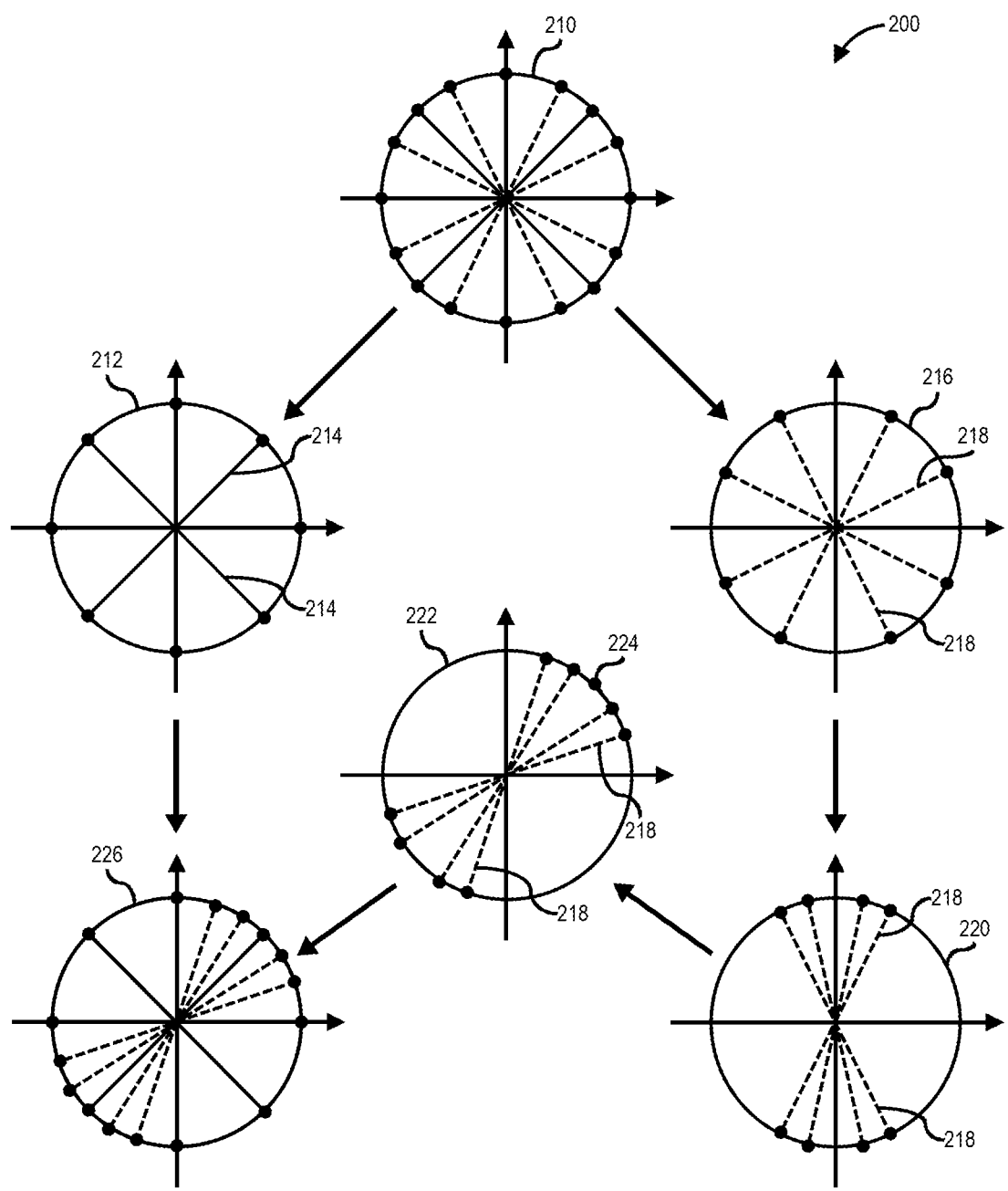
FIG. 2 is a diagram of a method of construction of a hybrid codebook using a fixed codeword codebook in accordance with one or more embodiments.

Referring now to FIG. 2, a diagram of a method of construction of a hybrid codebook using a fixed codeword codebook in accordance with one or more embodiments will be discussed. The construction method 200 of the codebook 116 as shown in FIG. 2 represents a hybrid approach wherein N fixed codewords are divided into two sets, a first set of codewords that remain fixed and a second set of codewords that are adaptive. In the example shown in FIG. 2, eight codewords of a fixed Grassmannian codebook 210 are divided into two sets of four codewords each, set 212 comprising four fixed codewords 214 and set 216 comprising four adaptive codewords 218. Initially, the original codebook 210 may be known at both the eNB 110 and the UE 112. In the present example, it is assumed that the eNB 110 has four transmit antennas, and the UE 112 has one receive antenna. The codewords comprise four complex numbers which exits in an eight dimensional space wherein each complex number is mapped to two real numbers. For example, if the codewords are represented by a 4-bit number, there codewords can represent 16 vectors on a sphere. The method 200 finds an optimal point on the sphere to represent the channel vector. Eight codewords may be represented by a 3-bit number. These are merely examples of how a given number of codewords may be mapped to complex space, and the scope of the claimed subject matter is not limited in these respects.

The codewords 214 of set 212 are evenly spread over the whole space in order to capture rapidly changing channels where successive codewords may be far apart. A first design parameter for codebook construction method 200 is the number of codewords 214 in the fixed set 212. The remaining codewords 218 comprise the adaptive set 216. These codewords 218 will track the channel 122 in order to adapt to the previously chosen codeword and cluster around it. In order to accomplish such clustering, the codewords 218 may be free to rotate towards a target which is the previous codeword. The codewords 218 are scaled as shown at 220 so that they are clustered together. As a result, a second design parameter for codebook construction method 200 is the amount of scaling to provide to the adaptive set of codewords 218. Next, the clustered codewords 218 are rotated to be centered on a target 224 which comprises the previously utilized codeword as shown at 222. Next, the adaptive codewords 224 that are scaled and rotated at 222 are merged with the fixed codewords 214 to arrive at a hybrid set 226 of codewords for codebook 116.

In one or more embodiments, from the hybrid set 226 of codewords, one particular codeword, the previously selected codeword $c_0$, may be selected for precoding for the next transmission wherein a precoding matrix indicator (PMI) may be utilized to minimize the quantization error for transmissions from eNB 110 to UE 112. In general, the precoding at eNB 110 may depend on the codeword (codeword index) fed back by the UE 112 as feedback 124 wherein the precoding may be determined based at least in part on the fed back codeword, or it may be a different codeword that is selected based at least in part on the fed back codeword. The selected codeword will be set as the new target for the next instance of codeword selection such that the adaptive codewords 218 will be scaled and rotated to be centered on the new target, codeword $c_0$. To initialize the codebook construction method 200, a codeword may be selected from the Grassmannian set 210 as the first target. Subsequently, the hybrid set 226 of codewords is used wherein the clustered adaptive codewords simply rotate to be centered on the previously selected codeword. It should be noted that clustering not only tracks the channel but also is capable of automatically focusing on the dominant directions caused by the presence of correlation. Furthermore, although an optimal codebook 116 comprising a fixed codebook set 212 of codewords and an adaptive codebook set 218 of codewords may be obtained to be used as a parent codebook, it should be noted that any codebook such as a Long Term Evolution (LTE) codebook or a Discrete Frequency Transformation (DFT) codebook and so on may be used as the parent codebook. Moreover, the number of fixed codewords 214 and adaptive codewords 218 may be different in general. In fact, further optimization of the number of codewords in each respective set of fixed and adaptive codewords may be performed. Any additional information such as a covariance matrix may be utilized to enhance such optimizations. Therefore, the scope of the claimed subject matter is not limited in these respects. Examples of how the adaptive codewords 218 of the adaptive set 216 may be scaled and rotated are discussed, below.

In one or more embodiments, before scaling and rotation are performed, the rotation matrix, R, may be obtained for the adaptive codewords 218 which may comprise complex vectors. Consider a 4 dimensional (4D) case wherein it is desired to rotate the 4D complex vector, $x=[x_1, x_2, x_3, x_4]^T$, to a target vector, $y=[y_1, y_2, y_3, y_4]^T$ where "T" stands for transpose. The following iterative algorithm illustrates how to obtain the desired rotation matrix, R.

1. Initialize, R=I where I is a 4×4 identity matrix.
2.

$$R_1 = \begin{bmatrix} a_1 & -b_1^* & 0 & 0 \\ b_1 & a_1^* & 0 & 0 \\ 0 & 0 & 1 & 0 \\ 0 & 0 & 0 & 1 \end{bmatrix}$$

where * represents the complex conjugate, $a_1=x_1^*y_1+x_2y_2^*$ and $b_1=x_1^*y_2-x_2y_1^*$.

3. Update x as $x=R_1x$.
4.

$$R_2 = \begin{bmatrix} a_2 & 0 & -b_2^* & 0 \\ 0 & 1 & 0 & 0 \\ b_2 & 0 & a_2^* & 0 \\ 0 & 0 & 0 & 1 \end{bmatrix}$$

where $a_2=x_1^*y_1+x_3y_3^*$ and $b_2=x_1^*y_3-x_3y_1^*$.

5. Update x as $x=R_2x$.
6.

$$R_3 = \begin{bmatrix} a_3 & 0 & 0 & -b_3^* \\ 0 & 1 & 0 & 0 \\ 0 & 0 & 1 & 0 \\ b_3 & 0 & 0 & a_3^* \end{bmatrix}$$

where $a_3=x_1^*y_1+x_4y_4^*$ and $b_3=x_1^*y_4-x_4y_1^*$

7. Update x as $x=R_3x$.
8.

$$R_4 = \begin{bmatrix} 1 & 0 & 0 & 0 \\ 0 & a_4 & -b_4^* & 0 \\ 0 & b_4 & a_4^* & 0 \\ 0 & 0 & 0 & 1 \end{bmatrix}$$

where $a_4=x_2^*y_2+x_3y_3^*$ and $b_4=x_2^*y_3-x_3y_2^*$

9. Update x as $x=R_4x$.
19.

$$R_5 = \begin{bmatrix} 1 & 0 & 0 & 0 \\ 0 & a_5 & 0 & -b_5^* \\ 0 & 0 & 1 & 0 \\ 0 & b_5 & 0 & a_5^* \end{bmatrix}$$

where $a_5=x_2^*y_2+x_4y_4^*$ and $b_5=x_2^*y_4-x_4y_2^*$

11. Update x as $x=R_5x$.
12.

$$R_6 = \begin{bmatrix} 1 & 0 & 0 & 0 \\ 0 & 1 & 0 & 0 \\ 0 & 0 & a_6 & -b_6^* \\ 0 & 0 & b_6 & a_6^* \end{bmatrix}$$

where $a_6=x_3^*y_3+x_4y_4^*$ and $b_6=x_3^*y_4-x_4y_3^*$

13. Update x as $x=R_6x$.

14. Overall rotation is given by $R=R_6R_5R_4R_3R_2R_1R$.

15. Repeat steps 2-14 until the chordal distance $\sqrt{1-|x^Hy|^2}$ is less than some threshold, where "H" stands for the conjugate transpose.

It should be noted that the above example algorithm to obtain the rotation matrix, R, is directed to a 4D rotation. However, this algorithm may be modified for any dimension to obtain a corresponding rotation. Although algorithm complexity may not be very high, if complexity is an implementation issue, some approximations may be utilized to simplify the implementation of the above algorithm, although the scope of the claimed subject matter is not limited in this respect.

When a set of codewords 218 is selected from a given codebook for the adaptive set 216, scaling of the adaptive codewords 218 may be implemented wherein the codeword set is scaled or shrunk to an appropriate level to obtain increased performance. Let the selected codeword set be $C=\{c_1, c_2, \ldots c_M\}$, and the center codeword is $c_c$. Further, let the level of scaling be set to $a \in (0,1)$. Then the codeword set 216 may be scaled as follows:

1. Find the rotation matrix, R, as explained herein, above, such that $u=Rc_c$ where $u=[1, 0, \ldots, 0]^T$.

2. Rotate the codeword set from C to $C'=\{c'_1, c'_2, \ldots, c'_M\}$ as $c'_i=Rc_i$. For the sake of simplicity, this operation may be written as C'=RC.

3. Each codeword $c'_i=[c'_{1,i}, \ldots, c'_{n_T,i}]^T$ can be written in polar coordinates as $$c'_i = \left[ r_{1,i}e^{j\theta_{1,i}}, \ldots, r_{n_T,i}e^{j\theta_{n_T,i}} \right]^T$$

where $n_T$ is the number of transmit antennas. The codeword needs to be scaled as $$c'_1 = \left[ \sqrt{1-a^2(1-r_{1,i}^2)}\, e^{j\theta_{1,i}}, ar_{2,i}e^{j\theta_{2,i}}, \ldots, ar_{n_T,i}e^{j\theta_{n_T,i}} \right]^T.$$

4. The final scaled codeword set is given by $C'=R^HC'$.

It should be noted that an optimal level of scaling, a, can be either calculated "offline" for different channel conditions and stored in a table at both the transmitter eNB 110 and receiver UE 112 to be used during system operation, or it can be optimized adaptively "online" at both the transmitter and receiver based at least in part on the selected codeword at a given step. Moreover, some form of adaptive scaling may be utilized in order to avoid extra feedback in the system.

Rotation of the scaled codeword set 220 may be performed after scaling. Unlike scaling, the adaptive codeword set 220 to be scaled may be rotated each time the channel state information (CSI) is updated. Let the selected scaled codeword set be $C'=\{c'_1, c'_2, \ldots, c'_M\}$ and the center codeword is $c'_c$. For rotation, the receiver first finds the codeword $c'_1$ such that $$c'_i = \underset{w \in c'}{\operatorname{argmax}} |h^H w|$$

where h is the channel to be quantized. The receiver then transmits the index i to the transmitter using the feedback link. Then, both the receiver and the transmitter calculate the rotation matrix such that as $c'_i = Rc'_c$ and the codeword set is adapted to the direction of h by $C' = RC'$. An example of a method for utilizing a hybrid codebook in such a manner is shown in and described with respect to FIG. 3, below.

Figure 3:
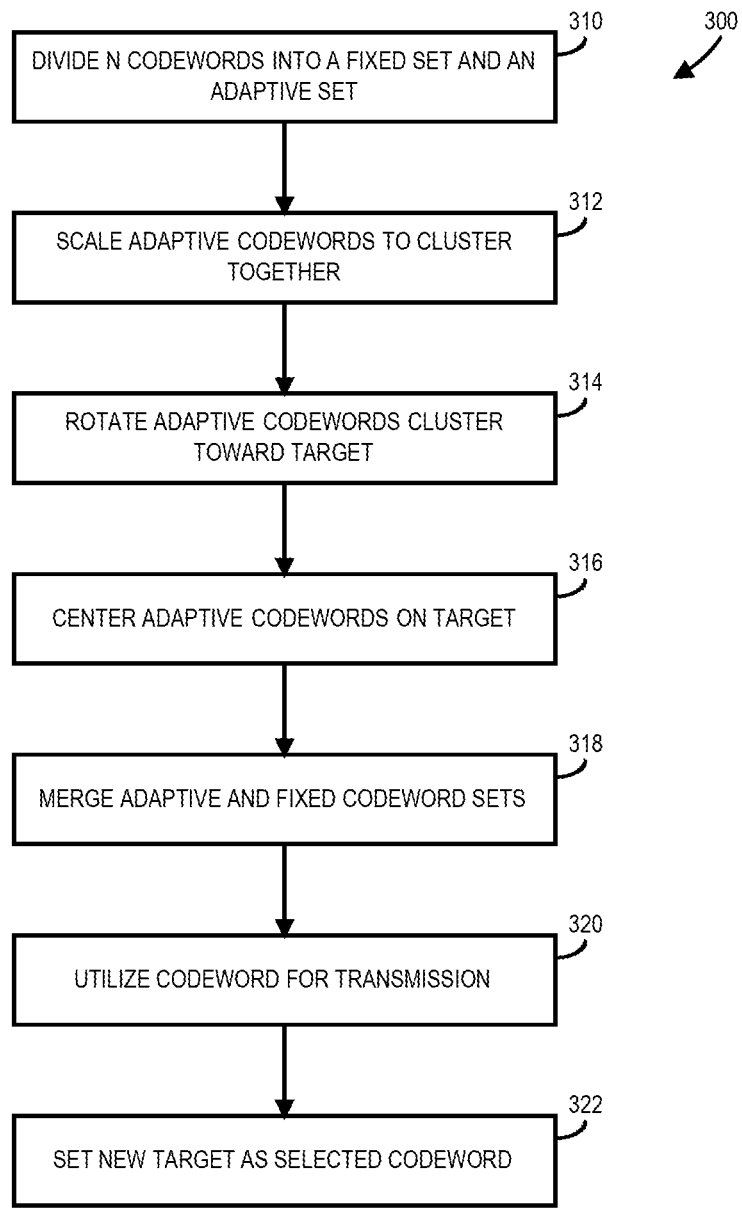
FIG. 3 is a flow diagram of a method for utilizing a hybrid codebook in accordance with one or more embodiments.

Referring now to FIG. 3, a flow diagram of a method for utilizing a hybrid codebook in accordance with one or more embodiments will be discussed. Although FIG. 3 shows one particular order of method 300, the blocks of method 300 may be arranged in various other orders in one or more embodiments, with more or fewer blocks, and the scope of the claimed subject matter is not limited in these respects. At block 310, N codewords may be divided into a fixed set of codewords and an adaptive set of codewords. The adaptive codewords may be scaled at bock 312 to cluster together. The adaptive codewords may then be rotated at block 314 to cluster toward the target 224, which may comprise an initially selected codeword for the first instance of execution of method 300, or may comprise the previously selected codeword from a previous transmission. The adaptive codewords may be centered on the target 224 at block 316, and then the adaptive codeword set may be merged with the fixed codeword set at block 318 to arrive at hybrid codeword set 226 for codebook 116. The eNB 110 may then utilize at block 320 a codeword from the hybrid codeword set 226 from codebook 116 to determine precoding during the next transmission. Then, at block 322 the new target 224 may be set as the codeword that was selected at block 320 for the next iteration of method 300. It should be noted that initially, the original codebook 210 is known at both eNB 110 and UE 112. The selected codeword based on channel estimation by the UE 112 may be indicated by transmitting the index of the selected quantized codeword to the eNB 110 from the UE 112 as feedback 124. Subsequently, method 300 may only need to involve rotation of the adaptive set of codewords at block 314, and the codeword selected by the UE 112 may be indicated to the eNB 112 by transmitting the index of the newly selected codeword from the UE 112 to the eNB 110. The codeword that is selected may be the codeword that results in a minimum, or nearly minimum, quantization error. The adaptive hybrid codebook 226 may be independently calculated by both the eNB 110 and the UE 112, or the hybrid adaptive codebook 226 calculated by one device may be transmitted to the other device. It should be noted that the fixed codewords in the hybrid codebook may be evenly spread over the whole space to capture rapidly changing channel conditions, whereas the adaptive codewords in the hybrid codebook may track slower changing variations in the channel, although the scope of the claimed subject matter is not limited in these respects.

Figure 4:
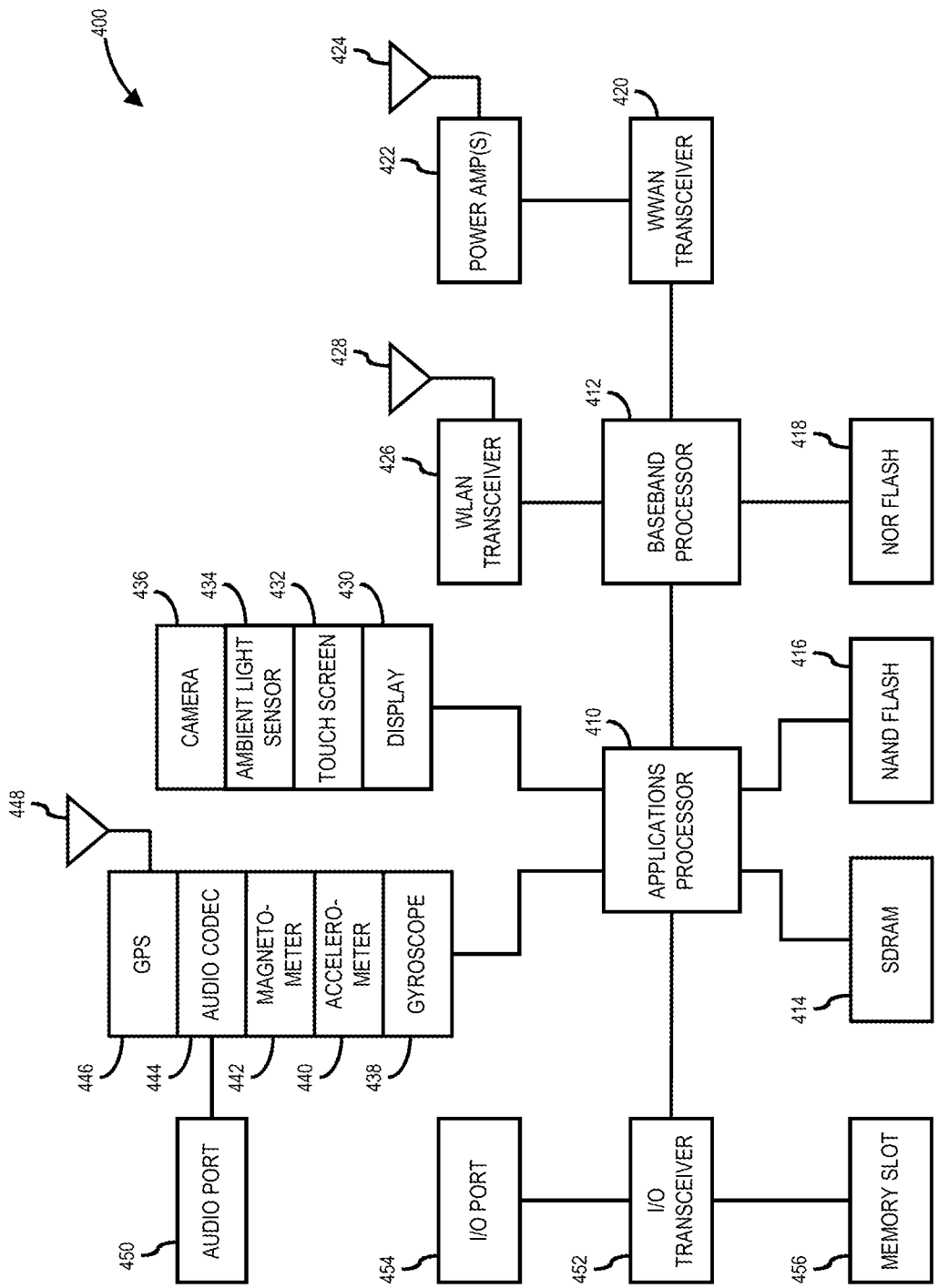
FIG. 4 is a block diagram of an information handling system capable of utilizing a hybrid codebook in accordance with one or more embodiments.

Referring now to FIG. 4, a block diagram of an information handling system capable of utilizing a hybrid codebook in accordance with one or more embodiments will be discussed. Information handling system 400 of FIG. 4 may tangibly embody one or more of any of the network elements, infrastructure nodes, or devices of wireless system 100 as shown in and described with respect to FIG. 1. For example, information handling system 400 may represent the hardware of eNB 110 or UE 112 with greater or fewer components depending on the hardware specifications of the particular device, node, or network element. Although information handling system 400 represents one example of several types of computing platforms, information handling system 400 may include more or fewer elements and/or different arrangements of elements than shown in FIG. 4, and the scope of the claimed subject matter is not limited in these respects.

In one or more embodiments, information handling system 400 may include an applications processor 410 and a baseband processor 412. Applications processor 410 may be utilized as a general purpose processor to run applications and the various subsystems for information handling system 400. Applications processor 410 may include a single core or alternatively may include multiple processing cores wherein one or more of the cores may comprise a digital signal processor or digital signal processing core. Furthermore, applications processor 410 may include a graphics processor or coprocessor disposed on the same chip, or alternatively a graphics processor coupled to applications processor 410 may comprise a separate, discrete graphics chip. Applications processor 410 may include on board memory such as cache memory, and further may be coupled to external memory devices such as synchronous dynamic random access memory (SDRAM) 414 for storing and/or executing applications during operation, and NAND flash 416 for storing applications and/or data even when information handling system 400 is powered off. Baseband processor 412 may control the broadband radio functions for information handling system 400. Baseband processor 412 may store code for controlling such broadband radio functions in a NOR flash 418. Baseband processor 412 controls a wireless wide area network (WWAN) transceiver 420 which is used for modulating and/or demodulating broadband network signals, for example for communicating via a 3GPP LTE network or the like as discussed herein with respect to wireless system 100 of FIG. 1. The WWAN transceiver 420 couples to one or more power amps 422 respectively coupled to one or more antennas 424 for sending and receiving radio-frequency signals via the WWAN broadband network. The baseband processor 412 also may control a wireless local area network (WLAN) transceiver 426 coupled to one or more suitable antennas 428 and which may be capable of communicating via a Wi-Fi, Bluetooth, and/or an amplitude modulation (AM) or frequency modulation (FM) radio standard including an IEEE 802.11 a/b/g/n standard or the like. It should be noted that these are merely example implementations for applications processor 410 and baseband processor 412, and the scope of the claimed subject matter is not limited in these respects. For example, any one or more of SDRAM 414, NAND flash 416 and/or NOR flash 418 may comprise other types of memory technology such as magnetic memory, chalcogenide memory, phase change memory, or ovonic memory, and the scope of the claimed subject matter is not limited in this respect.

In one or more embodiments, applications processor 410 may drive a display 430 for displaying various information or data, and may further receive touch input from a user via a touch screen 432 for example via a finger or a stylus. An ambient light sensor 434 may be utilized to detect an amount of ambient light in which information handling system 400 is operating, for example to control a brightness or contrast value for display 430 as a function of the intensity of ambient light detected by ambient light sensor 434. One or more cameras 436 may be utilized to capture images that are processed by applications processor 410 and/or at least temporarily stored in NAND flash 416. Furthermore, applications processor 410 may couple to a gyroscope 438, accelerometer 440, magnetometer 442, audio coder/decoder (CODEC) 444, and/or global positioning system (GPS) controller 446 coupled to an appropriate GPS antenna 448, for detection of various environmental properties including location, movement, and/or orientation of information handling system 400. Alternatively, controller 446 may comprise a Global Navigation Satellite System (GNSS) controller. Audio CODEC 444 may be coupled to one or more audio ports 450 to provide microphone input and speaker outputs either via internal devices and/or via external devices coupled to information handling system via the audio ports 450, for example via a headphone and microphone jack. In addition, applications processor 410 may couple to one or more input/output (I/O) transceivers 452 to couple to one or more I/O ports 454 such as a universal serial bus (USB) port, a high-definition multimedia interface (HDMI) port, a serial port, and so on. Furthermore, one or more of the I/O transceivers 452 may couple to one or more memory slots 456 for optional removable memory such as secure digital (SD) card or a subscriber identity module (SIM) card, although the scope of the claimed subject matter is not limited in these respects.

Figure 5:
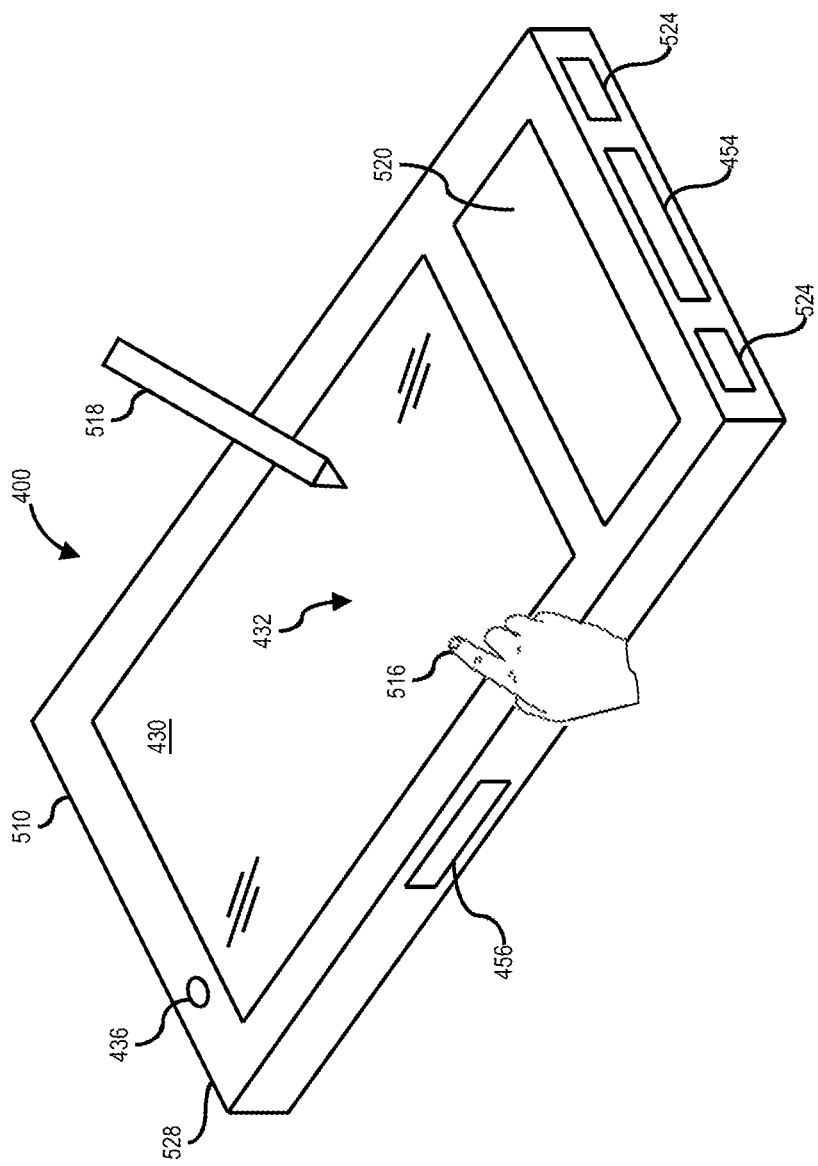
FIG. 5 is an isometric view of the information handling system of FIG. 4 that optionally may include a touch screen in accordance with one or more embodiments.

Referring now to FIG. 5, an isometric view of the information handling system of FIG. 4 that optionally may include a touch screen in accordance with one or more embodiments will be discussed. FIG. 5 shows an example implementation of information handling system 400 of FIG. 4 tangibly embodied as a cellular telephone, smartphone, or tablet type device or the like. In one or more embodiments, the information handling system 400 may comprise any one of the user equipment (UE) devices of FIG. 1, although the scope of the claimed subject matter is not limited in this respect. The information handling system 400 may comprise a housing 510 having a display 430 which may include a touch screen 432 for receiving tactile input control and commands via a finger 516 of a user and/or a via stylus 518 to control one or more applications processors 410. The housing 510 may house one or more components of information handling system 400, for example one or more applications processors 410, one or more of SDRAM 414, NAND flash 416, NOR flash 418, baseband processor 412, and/or WWAN transceiver 420. The information handling system 400 further may optionally include a physical actuator area 520 which may comprise a keyboard or buttons for controlling information handling system via one or more buttons or switches. The information handling system 400 may also include a memory port or slot 456 for receiving non-volatile memory such as flash memory, for example in the form of a secure digital (SD) card or a subscriber identity module (SIM) card. Optionally, the information handling system 400 may further include one or more speakers and/or microphones 524 and a connection port 454 for connecting the information handling system 400 to another electronic device, dock, display, battery charger, and so on. In addition, information handling system 400 may include a headphone or speaker jack 528 and one or more cameras 436 on one or more sides of the housing 810. It should be noted that the information handling system 400 of FIG. 8 may include more or fewer elements than shown, in various arrangements, and the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to hybrid codebook design for wireless systems and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. A method to generate a codebook for wireless transmissions, the method comprising:
   dividing a codebook into a fixed set of codewords and an adaptive set of codewords;
   scaling the adaptive set of codewords to cluster together;
   rotating the adaptive set of codewords to be centered or nearly centered about a target;
   merging the adaptive set of codewords with the fixed set of codewords to provide a hybrid codebook; and
   utilizing a codeword from the hybrid codebook to determine precoding for a transmission, wherein the codeword is selected from the adaptive set of codewords to adapt to channel variations, and the codeword is selected from the fixed set of codewords if the adaptive set of codewords is unable to track the channel variations.

2. The method as claimed in claim 1, wherein the target comprises a previously utilized codeword from a previous transmission.

3. The method as claimed in claim 1, wherein the target comprises an initial codeword for an initial transmission.

4. The method as claimed in claim 1, wherein the codeword utilized from the hybrid codebook is set as a new target for a subsequent transmission.

5. The method as claimed in claim 1, further comprising executing said rotating or said selecting, or combinations thereof, in one or more subsequent transmissions.

6. The method as claimed in claim 1, wherein the codebook of said dividing comprises a Grassmannian codebook, a Long Term Evolution (LTE) codebook, a Discrete Frequency Transformation (DFT) codebook, or another codebook.

7. The method as claimed in claim 1, wherein the codeword of said utilizing results in a minimum, or nearly minimum, quantization error for the transmission.

8. A user equipment device, comprising:
   a transceiver coupled to one or more antennas, the transceiver being configured to receive one or more reference signals; and
   a processor to control the transceiver, the processor being configured to:
      estimate a channel from the one or more reference signals, quantize the channel by selecting a codeword from a codebook, and transmit an index of the selected codeword to a base station; and
      determine a hybrid codebook to be utilized to receive one or more downlink channel transmissions from the base station, wherein the processor is configured to determine the hybrid codebook by:
         dividing the codebook into a fixed set of codewords and an adaptive set of codewords;
         scaling the adaptive set of codewords to cluster together;
         rotating the adaptive set of codewords to be centered or nearly centered about a target;
         merging the adaptive set of codewords with the fixed set of codewords to provide a hybrid codebook; and
         utilizing a codeword from the hybrid codebook to determine precoding for a transmission, wherein the codeword is selected from the adaptive set of codewords to adapt to channel variations, and the codeword is selected from the fixed set of codewords if the adaptive set of codewords is unable to track the channel variations.

9. The user equipment device as claimed in claim 8, wherein the base station determines the hybrid codebook and transmits hybrid codebook information to the transceiver, and the processor is configured to determine the hybrid codebook based at least in part on the received hybrid codebook information.

10. The user equipment device as claimed in claim 8, wherein the target comprises a previously utilized codeword from a previous transmission.

11. The user equipment device as claimed in claim 8, wherein the target comprises an initial codeword for an initial transmission.

12. The user equipment device as claimed in claim 8, wherein the codeword utilized from the hybrid codebook is set as a new target for a subsequent transmission.

13. The user equipment device as claimed in claim 8, wherein the processor is further configured to rotate the adaptive set of codewords or select a codeword from the hybrid codebook, or combinations thereof, in one or more subsequent transmissions.

14. The user equipment device as claimed in claim 8, wherein the codebook divided by the processor comprises a Grassmannian codebook, a Long Term Evolution (LTE) codebook, a Discrete Frequency Transformation (DFT) codebook, or another codebook.

15. The user equipment device as claimed in claim 8, wherein the codeword utilized from the hybrid codebook results in a minimum, or nearly minimum, quantization error for the transmission.

16. The user equipment device as claimed in claim 8, further comprising a touch screen to receive an input command from a finger or a stylus to control the processor.

17. A base station, comprising:
a transceiver coupled to one or more antennas, the transceiver being configured to transmit one or more reference signals to one or more user equipment devices and to receive one or more codeword indexes from the one or more user equipment devices indicative of a channel; and
a processor to control the transceiver, the processor being configured to:
determine a hybrid codebook to be utilized to transmit one or more downlink channel transmissions to the one or more user equipment devices, wherein the processor is configured to determine the hybrid codebook by:
dividing the codebook into a fixed set of codewords and an adaptive set of codewords;
scaling the adaptive set of codewords to cluster together;
rotating the adaptive set of codewords to be centered or nearly centered about a target;
merging the adaptive set of codewords with the fixed set of codewords to provide a hybrid codebook; and
utilizing a codeword from the hybrid codebook to determine precoding for a transmission, wherein the codeword is selected from the adaptive set of codewords to adapt to channel variations, and the codeword is selected from the fixed set of codewords if the adaptive set of codewords is unable to track the channel variations.

18. The base station as claimed in claim 17, wherein the processor is further configured to cause the transceiver to transmit hybrid codebook information to the one or more user equipment devices.

19. The base station as claimed in claim 17, wherein the target comprises a previously utilized codeword from a previous transmission.

20. The base station as claimed in claim 17, wherein the target comprises an initial codeword for an initial transmission.

21. The base station as claimed in claim 17, wherein the codeword utilized from the hybrid codebook is set as a new target for a subsequent transmission.

22. The base station as claimed in claim 17, wherein the processor is further configured to rotate the adaptive set of codewords or select a codeword from the hybrid codebook, or combinations thereof, in one or more subsequent transmissions.

23. The base station as claimed in claim 17, wherein the codebook divided by the processor comprises a Grassmannian codebook, a Long Term Evolution (LTE) codebook, a Discrete Frequency Transformation (DFT) codebook, or another codebook.

24. The base station as claimed in claim 17, wherein the codeword utilized from the hybrid codebook results in a minimum, or nearly minimum, quantization error for the transmission.

25. The base station as claimed in claim 17, further comprising a touch screen to receive an input command from a finger or a stylus to control the processor.

26. An article of manufacture comprising a non-transitory storage medium having instructions stored thereon that, if executed, result in:
dividing a codebook into a fixed set of codewords and an adaptive set of codewords;
scaling the adaptive set of codewords to cluster together;
rotating the adaptive set of codewords to be centered or nearly centered about a target;
merging the adaptive set of codewords with the fixed set of codewords to provide a hybrid codebook; and
utilizing a codeword from the hybrid codebook to calculate precoding for a transmission, wherein the codeword is selected from the adaptive set of codewords to adapt to channel variations, and the codeword is selected from the fixed set of codewords if the adaptive set of codewords is unable to track the channel variations.

27. The article of manufacture as claimed in claim 26, wherein the target comprises an initial codeword for an initial transmission, or a previously selected codeword from a previous transmission.

28. The article of manufacture as claimed in claim 26, wherein the instructions, if executed, further result in setting the codeword utilized from the hybrid codebook as a new target for a subsequent transmission.

\* \* \* \* \*